US011271924B1

United States Patent
Grun et al.

(10) Patent No.: US 11,271,924 B1
(45) Date of Patent: *Mar. 8, 2022

(54) IMAGE CAPTURE TO ENFORCE REMOTE AGENT ADHERENCE

(71) Applicant: West Corporation, Omaha, NE (US)

(72) Inventors: Eric A. Grun, Omaha, NE (US); April Lynn Peek, Elkhorn, NE (US); Chad Lynn Brockman, Omaha, NE (US); Trent Larson, Bennington, NE (US)

(73) Assignee: West Corporation, Omaha, NE (US)

( * ) Notice: Subject to any disclaimer, the term of this patent is extended or adjusted under 35 U.S.C. 154(b) by 283 days.

This patent is subject to a terminal disclaimer.

(21) Appl. No.: 16/127,289

(22) Filed: Sep. 11, 2018

Related U.S. Application Data

(63) Continuation of application No. 14/869,480, filed on Sep. 29, 2015, now Pat. No. 10,075,431, which is a continuation of application No. 13/208,075, filed on Aug. 11, 2011, now Pat. No. 9,147,047.

(51) Int. Cl.

| | |
|---|---|
| *H04L 29/06* | (2006.01) |
| *H04N 5/232* | (2006.01) |
| *H04N 1/00* | (2006.01) |
| *G06K 9/62* | (2022.01) |
| *G06F 21/36* | (2013.01) |
| *G06F 21/00* | (2013.01) |
| *G06F 16/70* | (2019.01) |

(52) U.S. Cl.
CPC ............ *H04L 63/083* (2013.01); *G06F 16/70* (2019.01); *G06F 21/00* (2013.01); *G06F 21/36* (2013.01); *G06K 9/6202* (2013.01); *H04N 1/00204* (2013.01); *H04N 5/23219* (2013.01)

(58) Field of Classification Search
CPC ..... H04L 63/083; H04L 67/04; G06K 9/6202; H04N 1/00204; H04N 5/23219; G08B 23/00; H04Q 7/00; G06F 19/323; G06F 16/70; G06F 21/00; G06F 21/36; G06F 7/04; H04M 1/67; H04M 11/04; H04M 1/72541; G07F 19/00; G06Q 40/00; G06Q 20/04; G06Q 20/10; G06Q 30/06; G06Q 40/02

See application file for complete search history.

(56) References Cited

U.S. PATENT DOCUMENTS

| | | | |
|---|---|---|---|
| 5,206,903 A | | 4/1993 | Kohler et al. |
| 5,742,675 A | * | 4/1998 | Kilander ............. H04M 3/5125 379/266.09 |
| 5,953,422 A | | 9/1999 | Angelo et al. |
| 5,960,073 A | | 9/1999 | Kikinis et al. |
| 7,466,235 B1 | | 12/2008 | Kolb et al. |

(Continued)

*Primary Examiner* — Thanhnga B Truong

(57) ABSTRACT

A method, a system, and computer readable medium comprising instructions for image capture to enforce remote agent adherence. The method comprises a first computer receiving an authentication request. The method also comprises a client component executing on the first computer detecting the authentication request and the client component, based on detecting the authentication request, causing a digital image to be captured. The method also comprises the first computer transmitting the digital image to a second computer, the second computer analyzing the digital image, and the second computer authenticating the digital image based on the analysis.

20 Claims, 2 Drawing Sheets

(56) References Cited

U.S. PATENT DOCUMENTS

| | | | |
|---|---|---|---|
| 7,984,300 B2 | 7/2011 | Fredlund et al. | |
| 8,358,811 B2 | 1/2013 | Adams et al. | |
| 8,832,787 B1 * | 9/2014 | Sanin .................. | G06F 21/41 |
| | | | 726/2 |
| 2006/0098104 A1 | 5/2006 | Fujii et al. | |
| 2007/0295803 A1 * | 12/2007 | Levine ............... | G06Q 20/04 |
| | | | 235/379 |

* cited by examiner

IMAGE CAPTURE TO ENFORCE REMOTE AGENT ADHERENCE

FIELD OF THE DISCLOSURE

The present disclosure relates generally to schedule and other performance adherence by remote agents. More particularly, the present disclosure provides a method, a system, and a computer readable medium comprising instructions for enforcing schedule and performance adherence among a plurality of agents using digital image capture of agents.

BACKGROUND OF THE DISCLOSURE

Manufacturers, service providers, airlines, financial organizations and governmental units historically employ large numbers of agents working primarily with the telephone, often using an automated call distribution system. The agents may answer incoming calls received on a toll free number. The agents may alternatively be telemarketers or collectors placing outgoing calls. Such organizations would build and staff large call centers to manage these hundreds or thousands of agents in some cases. Employees commute from their homes to the call centers to perform their work duties. There, supervisors can visually oversee the activities of agents and provide hands on management and coaching in person.

Call centers are, however, expensive to build and manage, requiring considerable fixed investment in real property, equipment, training and support services. In addition, because many organizations operate on a 24 hour basis, call centers must be kept open and staffed and managed on that basis. Agents are therefore required to commute to the call centers at all hours, a prospect that may not be attractive to all employees. This inconvenience limits the size of the pool of potential call center employees for the organization. The high cost of building and operating call centers as well as the inherent limitations on the available work force may cause senior management of these organizations to reconsider their service models.

SUMMARY OF THE DISCLOSURE

In an embodiment, a processor-implemented method is provided. The method comprises a first computer receiving an authentication request. The method also comprises a client component executing on the first computer detecting the authentication request and the client component, based on detecting the authentication request, causing a digital image to be captured. The method also comprises the first computer transmitting the digital image to a second computer, the second computer analyzing the digital image, and the second computer authenticating the digital image based on the analysis.

In an embodiment, a system is provided. The system comprises a processor, a memory, and an application that, when executed on the processor, detects the input of an authentication request and causes a digital image to be captured. The system also transmits the digital image to a server computer wherein the digital image is analyzed and authenticated based on the analysis.

In an embodiment, a computer readable medium is provided, the computer readable medium comprising instructions for a first computer receiving an authentication request and a client component executing on the first computer detecting the authentication request. The computer readable medium also comprises instructions for the client component, based on detecting the authentication request, causing a digital image to be captured. The computer readable medium also comprises instructions for the first computer transmitting the digital image to a second computer wherein the digital image is analyzed and authenticated based on the analysis.

DETAILED DESCRIPTION OF THE INVENTION

Figure 1:
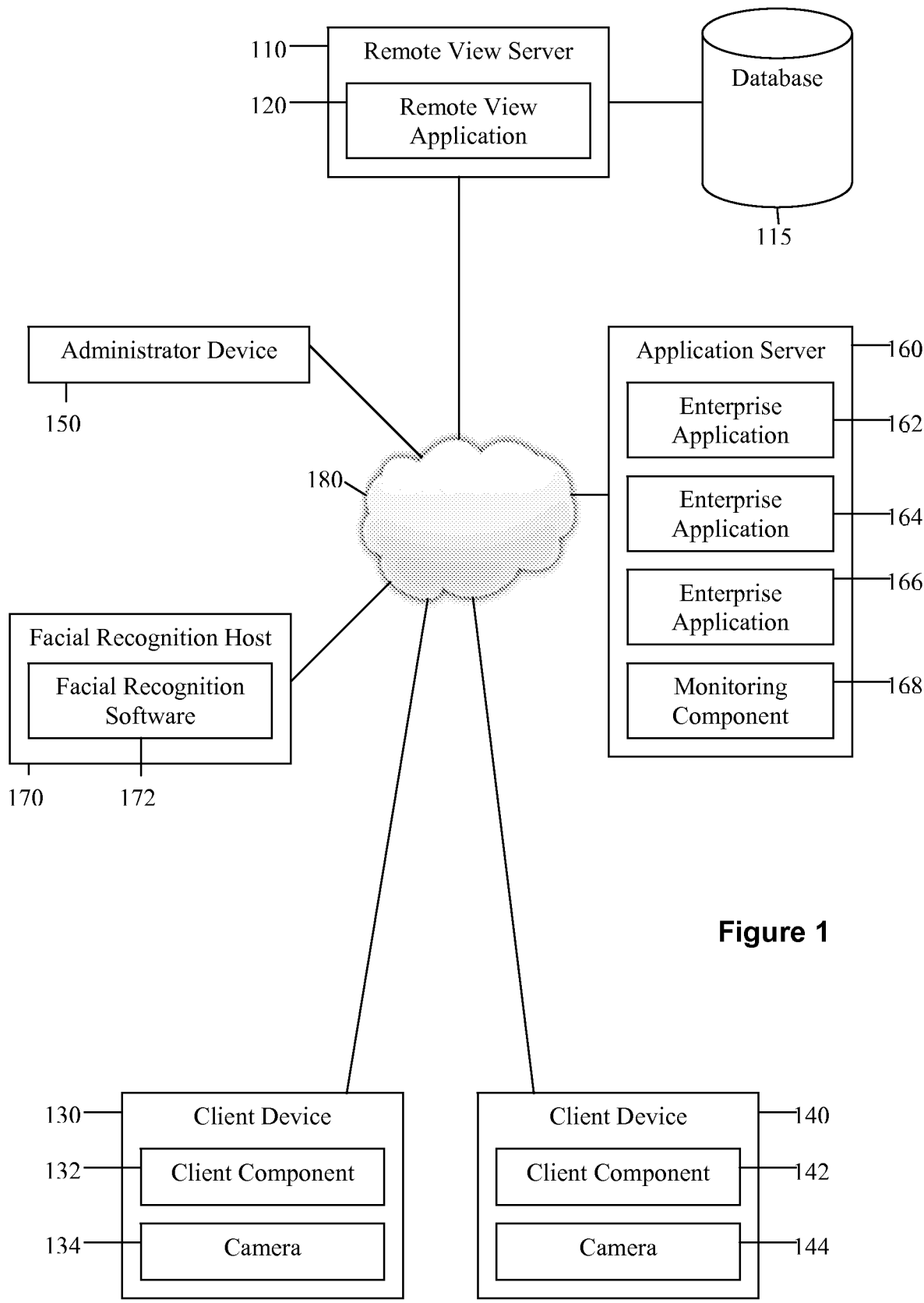
FIG. 1 depicts a diagram of a system for image capture to enforce remote agent adherence in accordance with an embodiment of the disclosure.

Turning to FIG. 1, a system 100 is provided. The system comprises a remote view server 110, a remote view application 120, client devices 130, 140, client components 132, 142, cameras 134, 144, an administrator device 150, an enterprise application server 160, enterprise applications 162, 164, 166, a monitoring component 168, a facial recognition host 170, and facial recognition software 172.

The remote view server 110 is a computer system. Computer systems are described in detail hereinafter. The remote view application 120 is hosted by the remote view server 110 and may be a web service. The remote view application 120 receives digital images from client devices 130, 140. In some instances, the remote view application 120 may send the captured digital images to an administrator device 150 for review and approval. The remote view application 120 may also compare the digital images with digital images previously received from the client devices 130, 140 and may use the facial recognition software 172 for this task. Based on the results of the comparison and feedback from the administrator device 150, if applicable, as well as the receipt of other credentials from the client devices 130, 140, the remote view application 120 may recommend authentication of the client devices 130, 140. This process may be required by policies implemented by an enterprise to enforce security and discipline upon employees, contractors or others who may work remotely, for example at home offices. These steps may be taken selectively for certain employees. Policies requiring these steps may apply when employees are accessing certain applications or confidential information or executing certain transactions.

A large enterprise such as an insurance company, bank or telemarketing company may employ many thousands of agents to provide telephone customer care, perform account collections or make outgoing sales calls. The enterprise may determine that it makes economic sense to employ the agents to work at remote locations, such as in their homes, as opposed to building call centers wherein employees must commute to work. The enterprise may supply the agents with the client devices 130, 140 to use in conducting their work activities from their home offices. The enterprise may provide telephones and other communications equipment and connectivity services to the agents. The agents may work prescribed shifts, logging in to the enterprise's data network using their client devices 130, 140. The agents may additionally log into the enterprise's automatic call distribution (ACD) system from their telephones at the start of their shifts when the agents' work comprises answering incoming calls. Agents whose work tasks comprise placing outgoing telephone calls may log into another call tracking and observation system.

While employing agents to work in home or other remote offices as opposed to having agents work at call centers may be attractive from a cost perspective, this arrangement also presents management challenges and risks. Agents working remotely cannot be closely supervised as they can be in a call center. When agents are empowered to commit the enterprise financially or legally and may electronically disburse or otherwise handle funds or other items of value, this presents additional challenges and risks. Because the enterprise cannot physically oversee agents working remotely, it may seek other means to verify their presence in their workplaces and observe their activities.

The present disclosure teaches a method, system and computer readable medium that promotes the enterprise to capture digital images of agents at their client devices 130, 140 as they authenticate with the enterprise's network and enterprise applications 162, 164, 166 at the beginning of their work shifts and at other times. The method comprises the client device 130 causing the camera 134 to capture a digital image, i.e. take a digital photograph, of the agent and transmit the digital image to the remote view server 110. This process may take place upon the agent using client device 130 initially authenticating with the enterprise's corporate or other network at the beginning of the agent's work shift. Capturing of the digital image may be a required step in addition to the agent entering authentication credentials, such as a network password. Capturing of the digital image may in addition to or alternatively take place after initial enterprise network authentication by the agent but upon the agent attempting to access the enterprise application 162 that is protected. The enterprise may require digital images to be captured of agents when the agents seek to access some enterprise applications 162 but not other enterprise applications 164, 166. Digital images may be required under other circumstances, such as when an agent is executing transaction exceeding a monetary limit, for example, or when the agent's actions have been made subject to review for disciplinary or other reasons.

The remote view server 110 may be located on the premises of the enterprise and be connected directly or indirectly to the application server 160 hosting the enterprise applications 162, 164, 166 that agents may remotely access to complete their tasks. The remote view server 110 is also connected to components (not depicted in FIG. 1) associated with authentication to the enterprise network. When a user situated at the client device 130 is to begin his or her work shift, the user may enter credentials, for example a password, that are passed across a secure connection to the enterprise network for authentication. The client component 132 executing on the client device detects this action and may cause a digital image to be captured and transmitted without external prompting. Alternatively or in addition, authentication components in the enterprise network may identify the user account as that of a remote agent. Consulting a policy or other rule stored in the enterprise network, the remote view application 120 or other component may determine that a digital image of the user is required in addition to the credentials and may send notification to the client device 130.

The client component 132, 142 is a software module resident on the client devices 130, 140, respectively, that exchanges messages with the remote view application 120. The client component 132, 142 may be a dynamic link library (DLL) software module that provides an application programming interface (API) to integrate the functionality taught herein into operating system software and client applications executing on the client devices 130, 140. The client component 132, 142 makes calls to the remote view application 120 and submits captured digital images to it. The client component 132, 142 controls the camera 134, 144 and responds to commands from the remote view application 120 to capture a digital image of the user at various times.

The client component 132 focuses the camera 134, zooms in and zooms out, and makes other adjustments to the camera 134 such that a digital image of acceptable quality is captured of the user's face and head. The client component 132 may deliver pop-ups or other messages to the monitor screen of the client device 130, the messages directing the user to shift his or her physical position or make other adjustments to enable a digital image of acceptable quality to be captured. The user may be given the option to review the digital image and have another digital image taken.

The camera 134, 144 is a digital camera mounted on the monitor of the client device 130, 140 or otherwise physically positioned such that digital images may be taken of the person situated at the client device 130, 140. The camera 134, 144 may be physically integrated into the client device 130, 140. The camera 134, 144 may be configured and secured such that it cannot be tampered with or reconfigured by the user or others. In an embodiment, the camera 134, 144 may be accessible only by the client component 132, 142 and may not be accessible by the user.

The client component 132 may be programmed to cause the camera 134 to capture a digital image of the user when the user attempts to authenticate with the enterprise network or access at least one of the enterprise applications 162, 164, 166 that is subject to protection as taught herein. The client component 132 may not first receive a message from the remote view application 120 or other external component before causing the camera 134 to capture the digital image. The client component 132 instead captures the digital image without external prompting and transmits the digital image either separately or along with the password or other credentials. The remote view server 110 receives the digital image and the remote view application 120 then performs its authentication of the digital image that may in some cases include contacting an administrator or other component to request review.

The process may also be initiated by the remote view server 110. The client component 132 may not activate the camera 134 and capture and transmit the digital image until prompted by the remote view server 110. The user of the client device 130 may first enter and transmit credentials that are received by an authentication component within the enterprise and remote from the client device 130. It may be determined from a rule, policy or other mechanism at this point that the user of the client device 130 is a member of a group, for example remote agents, that is subject to digital image capture and verification before access to some or all enterprise resources is granted. The remote view application 120 may read the rule or policy or receive notification of the rule or policy from another component. The remote view application 120 may send a message to the client device 130 requesting that a new digital image be captured and transmitted for verification and completion of authentication. The client component 132 processes this message, causes the camera 134 to capture the digital image, and transmits the digital image to the remote view server 110 for processing.

In either embodiment, wherein the client component 132 detects attempted sign-on and captures and transmits a digital image or wherein the remote view application 120 receives notification of the sign-on attempt and initiates the process by directing the client component 132 to capture and transmit a digital image, the remote view application 120 running on the remote view server 110 receives and processes the digital image.

In a first use case, once the digital image of the user logging in has been captured and stored in the database 115, an administrator using an administrator device 150 may build reports about the users who have logged in. If there is any question as to the identity of the user visible in the digital image, the administrator may take action such as contacting the user and requesting that the user sit for an additional digital image. The administrator may additionally disconnect the user from the protected application 162 or log the user out of the enterprise network entirely. The administrator may engage supervisors and may forward the digital images and identifying information to the appropriate supervisors for corrective and disciplinary action if necessary.

In a second use case, the enterprise may integrate an automated facial recognition software system into the processes taught herein. The facial recognition software host 170 contains facial recognition software 172 that may comprise a commercially available third party facial recognition software product that is integrated with the remote view application 120. The remote view application 120 accesses the facial recognition software 172 and requests it to compare the newly captured digital image to at least one previously captured digital image of the subject user stored in the database 115. The remote view application 120 relies on the facial recognition software 172 to determine whether the newly captured image resembles the at least one previously captured image to an acceptable level. The remote view application 120 may make such a determination itself based on its own criteria. If the new and stored images are do not acceptably resemble each other, the remote view application 120 may communicate with the client component 132 on the subject client device 130 and direct that another digital image be captured and transmitted for analysis.

In a third use case, administrators may review currently working agents. An administrator may obtain from the remote view application 120 a snapshot-style report of the agents currently logged into the enterprise network or using an enterprise application 162, 164, 166 that is protected by the components provided herein. The administrator may draw digital images used in previous comparisons for each listed agent from the database 115. The administrator may rapidly review the report and the comparison digital images and gain confidence that the agents signed in are all hired staff or contractors. In the case of an indeterminate digital image, the administrator may cause the remote view application 120 to contact the client component 132 on the subject client device 130. The client component 132 may direct the camera 134 to capture a new digital image that is then transmitted to the remote view application 120 for visual verification by the administrator.

In a fourth use case, administrators may build a report from stored digital images of a single agent or group of agents. Digital images may be stored in the database 115 for a predetermined period according to business rules. If an agent comes under investigation for his or her activities, a report can be assembled to demonstrate that the agent was in fact the person at the client device 130 during the time intervals recorded. The administrator may also build reports to verify all of the agents that were working for a specified week or other period. The administrator may choose the timeframe and select the user name of the agent or a workgroup from which to build a report. Each digital image will be displayed with the user name of the agent and timestamp information indicating when the digital image was captured. Each image may also be accompanied by text describing how the digital image was originated, for example during an initial authentication, when subsequently accessing a protected enterprise application 162, 164, 166, at an interval during a work shift, at the request of an administrator or supervisor or in accordance with an automated rule.

In a fifth use case, agent activity associated with specific enterprise applications 162, 164, 166 may result in a need for a digital image to be captured and transmitted. While the enterprise may require digital images to be captured along with credentials at initial sign-on, the enterprise may also require the capturing of additional digital images when a protected enterprise application 162 is accessed and/or when one or more predetermined actions are taken with the enterprise application 162. The monitoring component 168 executing on the application server 160 is configured to detect when such a protected enterprise application 162 is accessed and/or when an agent takes an action wherein capturing an additional digital image is deemed necessary.

The monitoring component 168 may consult rules when some actions are taken with the enterprise application 162 and determine that a new digital image is necessary. For example, a customer care agent with authority to disburse funds or grant discounts or rate concessions may execute a transaction that is considerably larger than usual or otherwise out of the ordinary for that agent and/or for the customer involved. The rule consulted by the monitoring component requires that a new digital image is captured and transmitted. This may deter agent fraud and permit the enterprise to enforce discipline upon agents.

The monitoring component 168 may communicate the requirement of the new digital image via the messaging system of the enterprise. The client device 130 associated with the agent in question receives a message containing the requirement and the client component 132 processes the message. The client component 132 takes control of the camera 134 and causes the camera 134 to capture a digital image. The client component 132 transmits the new digital image to the remote view server 110. The digital image is stored in the database 115 and subject to review by an administrator or supervisor and by using the facial recognition software 172 when deemed necessary. Each digital image may have an electronic memorandum attached indicating the reason the digital image was captured.

While five use cases have been presented herein, the use cases comprise embodiments of the present disclosure. It may be readily appreciated by a person of ordinary skill in the art that a plurality of additional embodiments using the teachings and components described herein may be provided.

A plurality of options is available for how the components of system 100 may be configured to capture the digital image. A first method comprises the camera 134 simply capturing a digital image of whatever is in front of the camera 134 at that time. A second method comprises the client component 132 being configured to wait until a human face is centered in the viewing frame of the camera 134 before capturing the digital image. In an embodiment, the agent may be given an option to indicate, within a short time period, when he or she is ready to be photographed, and may also have the option of having a second and replacement digital image captured after review by the agent of the initial digital image. An administrator or other person may review the digital image and determine if another digital image is required. If the digital image was not focused or if there is otherwise a problem with the quality of the digital image, the administrator may contact the agent through instant messaging or other mechanism. In an embodiment, a live stream may be captured by the camera 134 of the agent's activities.

The components of the system 100 may be configured to automatically capture and save digital images without interaction by the agent. The camera 134 may wait until the agent's face is focused in the center of the viewing frame before capturing the digital image. In this case, the agent need only look at the camera and hold his or her head and face steady for several seconds. The client component 132 causes the camera to automatically capture the digital image and transmit it to the remote view server 110.

In the event of an error, or if the agent closes a window or screen providing the agent the opportunity to have the digital image captured or erased and captured again, the client component 132 may return a failure message to the remote view server 110 that may in turn notify the administrator device 150. Other conditions that may result in an error or failure message comprise an inability of the client component 132 to find or properly operate the camera 134, the client component 132 working together with the remote view server 110 unable to recognize a face in the captured digital image, or connectivity problems, such as the client component 132 and the remote view server 110 unable to communicate properly.

The system 100 also provides a reporting site to generate multiple types of reports, for example a report for an individual user or group of users assigned to a workgroup or skill. Reporting may be by skill, by agent identification and by user names. In addition, a specific date or date range could be added to the described report types to limit the number of records provided in a report.

Each digital image captured by the camera 134 and transmitted by the client component 132 may be assigned a unique randomly generated key. The key is passed back to the enterprise application 162 or other component that originally caused the client component 132 or the remote view application 120 to trigger the capturing of the digital image. The use of the key may prevent "man in the middle" attacks and permits verification that the digital image is valid.

Access to the components hosted by the remote view server 110 is authenticated session-based. An authenticated session can be initiated by the client device 130 and the client component 132 communicating with the remote view server 110 through a secondary secure channel. Even though some of the components of the remote view server 110 may be Internet accessible, requests to the components are discarded unless accompanied by a secure session token created by the client device 130.

Digital images stored in the database 115 may be automatically deleted after a period of time that may be configurable according to business rules. The client component 132 may be a plug-in to existing authentication applications and may also be incorporated as part of a web site's authentication process.

The network 180 is public or private data network carrying transmissions between the components of the system 100. The network 180 may comprise voice transmission media carrying data transmissions. Portions of the network 180 may be carried on private transmission lines and other portions of the network 180 may be carried on public transmission lines.

The general purpose computer comprises processor or central processing unit (CPU), read-only memory, random access memory, data storage, and input/output devices. The general purpose computer may also comprise network interface cards (NIC) to communicate on a local area network (LAN) and other hardware promoting communication over wide area networks and the Internet.

Although the above descriptions set forth preferred embodiments, it will be understood that there is no intent to limit the embodiment of the disclosure by such disclosure, but rather, it is intended to cover all modifications, substitutions, and alternate implementations falling within the spirit and scope of the embodiment of the disclosure. The embodiments are intended to cover capabilities and concepts whether they be via a loosely coupled set of components or they be converged into one or more integrated components, devices, circuits, and/or software programs.

Figure 2:
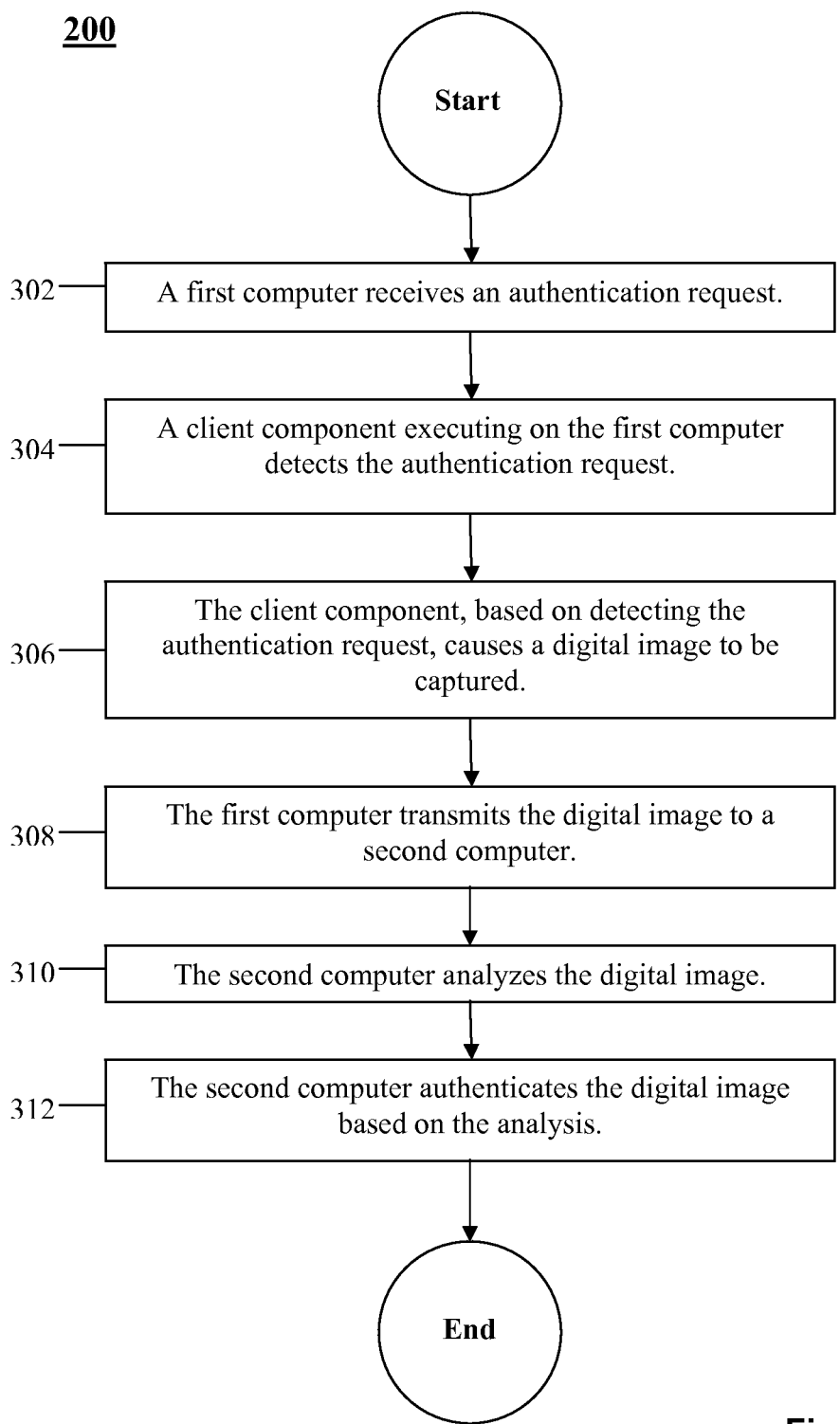
FIG. 2 depicts a flowchart of a method of image capture to enforce remote agent adherence in accordance with an embodiment of the present disclosure.

Turning to FIG. 2, a method 200 is provided. At block 202, a first computer receives an authentication request. At block 204, a client component executing on the first computer detects the authentication request. At block 206, the client component, based on detecting the authentication request, causes a digital image to be captured. At block 208, the first computer transmits the digital image to a second computer. At block 210, the second computer analyzes the digital image. At block 212, the second computer authenticates the digital image based on the analysis.

What is claimed is:

1. A processor-implemented method, comprising:
    receiving, by a first computer, an authentication request including a network password and that is associated with accessing at least one application on a network;
    capturing a digital image of a user of the first computer by a digital camera associated with the first computer;
    transmitting, by the first computer, the digital image to a second computer for authenticating the digital image; and
    receiving, by the first computer, access to the at least one application based on the authenticated digital image.

2. The processor-implemented method of claim 1, wherein the first computer is a client computer and the second computer is a server computer, the server computer accessing a plurality of stored digital images.

3. The processor-implemented method of claim 1, further comprising:
    displaying, by the first computer, a message regarding adjustments to enable the captured digital image to be of acceptable quality.

4. The processor-implemented method of claim 1, wherein the capturing the digital image further comprises:
    capturing the digital image based on receiving an instruction from the second computer.

5. The processor-implemented method of claim 1, further comprising:
    accessing the at least one application wherein based on the second computer authenticating the digital image and verifying the network password.

6. The processor-implemented method of claim 1, wherein the digital image is captured and authenticated to provide security supplemental to the network password and wherein content of the digital image is separate from and unrelated to content of the network password.

7. The processor-implemented method of claim 1, wherein the digital image is captured a second time if determined to be unsatisfactory.

8. The processor-implemented method of claim 1, wherein the second computer authenticating the digital image comprises:
   comparing the digital image with at least one previously captured digital image.

9. The processor-implemented method of claim 8, wherein the second computer uses facial recognition software to compare the digital image with the previously captured digital image.

10. The processor-implemented method of claim 1, further comprising:
   the second computer receiving approval of the digital image from a third computer prior to authenticating the digital image,
   wherein the third computer is associated with at least one of an administrative and a supervisory function.

11. The processor-implemented method of claim 1, wherein the first computer is situated at a location geographically remote from the second computer and the third computer.

12. The processor-implemented method of claim 11, wherein at least one of the second computer and the third computer are located at a call center with which the user is associated.

13. The processor-implemented method of claim 1, further comprising:
   receiving, by the first computer, a message from the second computer subsequent to authentication based on a transaction entered by the first computer, the message requesting capturing and transmission of an additional digital image.

14. The processor-implemented method of claim 13, wherein the second computer sends the message based on the transaction entered by the first computer meeting a criterion.

15. The processor-implemented method of claim 1, wherein the second computer is a web server and wherein the second computer interacts with the first computer using at least one web service one of hosted by and accessed by the second computer.

16. The processor-implemented method of claim 1, further comprising:
   the second computer storing a plurality of digital images captured over a duration for use in enforcing security and disciplinary policies.

17. The processor-implemented method of claim 1, further comprising:
   receiving, by the first computer, a request to initiate an instant messaging session requesting the capturing of at least one additional digital image when the digital image is determined unacceptable by at least one of the second computer, an administrator, and a supervisor.

18. The processor-implemented method of claim 1, further comprising:
   receiving, by the first computer, an instruction from the second computer, the instruction causing the first computer to cause a live digital video stream to be captured and transmitted to the second computer.

19. A system, comprising:
   a processor;
   a memory storing an application that when executed by the processor causes the processor to:
      receive an authentication request including a network password and that is associated with an access of at least one application on a network;
      capture a digital image of a user of the first computer by a digital camera associated with the first computer; and
      transmit the digital image to a server computer for authentication;
      and
      receive access to the at least one application based on the authenticated digital image.

20. A computer readable medium storing instructions that when executed by a processor of a first computer cause the processor to perform:
   receiving an authentication request including a network password and that is associated with accessing at least one application on a network; and
   capturing a digital image of a user of the first computer by a digital camera associated with the first computer based on detecting the authentication request;
   transmitting the digital image to a second computer for authenticating the image; and
   receiving access to the at least one application based on the authenticated digital image.

* * * * *